United States Patent
Swartz et al.

(10) Patent No.: US 12,469,967 B2
(45) Date of Patent: Nov. 11, 2025

(54) TRAFFIC AND USER AWARE PHYSICAL LAYER SHIELDING FOR SECURE TELEWORKER USING RECONFIGURABLE INTELLIGENT SURFACE DEVICE

(71) Applicant: Cisco Technology, Inc., San Jose, CA (US)

(72) Inventors: John Matthew Swartz, Lithia, FL (US); Nagendra Kumar Nainar, Morrisville, NC (US); Carlos M. Pignataro, Cary, NC (US); Matthew Aaron Silverman, Shaker Heights, OH (US); Ardalan Alizadeh, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 925 days.

(21) Appl. No.: 17/678,154

(22) Filed: Feb. 23, 2022

(65) Prior Publication Data
US 2023/0268650 A1    Aug. 24, 2023

(51) Int. Cl.
| | |
|---|---|
| H01Q 3/46 | (2006.01) |
| H04B 1/04 | (2006.01) |
| H04B 7/0426 | (2017.01) |
| H04W 12/02 | (2009.01) |
| H04W 56/00 | (2009.01) |
| H04W 72/23 | (2023.01) |

(52) U.S. Cl.
CPC ............... *H01Q 3/46* (2013.01); *H04B 7/043* (2013.01); *H04W 12/02* (2013.01)

(58) Field of Classification Search
None
See application file for complete search history.

(56) References Cited

U.S. PATENT DOCUMENTS

| | | |
|---|---|---|
| 8,462,863 B1 | 6/2013 | Zhang et al. |
| 2016/0127937 A1 | 5/2016 | Schelstraete et al. |
| (Continued) | | |

FOREIGN PATENT DOCUMENTS

| | | |
|---|---|---|
| CN | 112350762 A | 2/2021 |
| WO | 2020254031 A1 | 12/2020 |

OTHER PUBLICATIONS

Sang In Kim et al., "Mid-amble Aided OFDM Performance Analysis in High Mobility Vehicular Channel", 2008 IEEE Intelligent Vehicles Symposium, 10.1109/IVS.2008.4621156, Jun. 4-6, 2008, 4 pages.

(Continued)

*Primary Examiner* — Pablo N Tran
(74) *Attorney, Agent, or Firm* — Edell, Shapiro & Finnan, LLC

(57) ABSTRACT

A system and methods by which a reconfigurable intelligent surface device is dynamically configured to control the reflection of transmissions made between an access point and one or more client devices so as to protect the transmissions from being properly received by an unauthorized device. These methods may be used to maintain data confidentiality, particularly for remote workers. The positions of the access point and client devices are used to configure the reconfigurable intelligent surface device to reflect the transmissions inward and avoid/minimize leakage outside a physical space.

20 Claims, 11 Drawing Sheets

(56) References Cited

U.S. PATENT DOCUMENTS

| | | | |
|---|---|---|---|
| 2016/0345278 A1 | 11/2016 | Chu et al. | |
| 2020/0343953 A1 | 10/2020 | Sridharan et al. | |
| 2021/0045134 A1 | 2/2021 | Zhou et al. | |
| 2024/0106499 A1* | 3/2024 | Sahraei | H04L 27/26025 |
| 2024/0187042 A1* | 6/2024 | Elshafie | H04B 7/04013 |
| 2024/0243795 A1* | 7/2024 | Hemadeh | H04B 7/0617 |
| 2024/0259051 A1* | 8/2024 | Li | H04B 7/18504 |
| 2024/0388328 A1* | 11/2024 | Elshafie | H04B 7/0639 |
| 2024/0422748 A1* | 12/2024 | Fujishiro | H04W 76/23 |
| 2025/0016840 A1* | 1/2025 | Sahraei | H04L 5/0023 |
| 2025/0055502 A1* | 2/2025 | Sahraei | H04B 7/04013 |

OTHER PUBLICATIONS

Narendra Anand et al., "STROBE: Actively Securing Wireless Communications using Zero-Forcing Beamforming", 2012 Proceedings IEEE INFOCOM, 10.1109/INFCOM.2012.6195817, Mar. 2012, 9 pages.

Qingqing Wu et al., "Towards Smart and Reconfigurable Environment: Intelligent Reflecting Surface Aided Wireless Network", arXiv:1905.00152v5 [cs.IT], Aug. 30, 2019, 8 pages.

Kiao Lu et al., "Intelligent Reflecting Surface (IRS)-Enabled Covert Communications in Wireless Networks", arXiv:1911.00986v2 [cs.NI], Apr. 2, 2020, 15 pages.

\* cited by examiner

US 12,469,967 B2

TRAFFIC AND USER AWARE PHYSICAL LAYER SHIELDING FOR SECURE TELEWORKER USING RECONFIGURABLE INTELLIGENT SURFACE DEVICE

TECHNICAL FIELD

The present disclosure relates to wireless networking.

BACKGROUND

The nature of wireless signal propagation is not a straight line and it expands in all directions like a wave generated by a pebble in a still pond. The selection of the frequency or the signal strength, can be used to control the radius of the propagation. Due to the nature of wireless signal propagation, it is common to see multiple Wi-Fi® wireless networks overlapping, especially in higher density living arrangements, such as apartment buildings. There are privacy and security concerns, particularly for network users that work from home.

DESCRIPTION OF EXAMPLE EMBODIMENTS

Overview

Briefly, a system and methods are provided by which a reconfigurable intelligent surface device is dynamically configured to control the reflection of transmissions made between an access point and one or more client devices so as to protect the transmissions from being properly received by an unauthorized device. These methods may be used to maintain data confidentiality, particularly for remote workers. The positions of the access point and client devices are used to configure the reconfigurable intelligent surface device to reflect the transmissions inward and avoid/minimize leakage outside a physical space.

In one form, a method is provided that involves, serving, with a wireless access point, traffic in a wireless network with at least one wireless client device; and adjusting reflectivity characteristics of a reconfigurable intelligent surface device to reflect a transmission made by the wireless access point or by the at least one wireless client device towards a first location.

EXAMPLE EMBODIMENTS

Presented herein are techniques to shield transmissions from being received and the information contained in them recovered by unwanted devices.

When there are multiple wireless networks, such as Wi-Fi wireless local area networks (WLANs) operating in close proximity (multiple service set identifiers (SSIDs) belonging to different owners), there are security concerns. Such a situation can be vulnerable to hackers and rogue users who are looking for opportunities to obtain confidential data by hacking into wireless networks.

With more of the workforce moving towards remote working, a zero trust environment/network is becoming a common consideration to ensure that all potential security vulnerabilities are taken care. Any user accessing or executing critical applications or data needs to protect such data as any leak may result in directly impacting revenue of a business or other life-critical functions of an organization.

Systems and methods are presented herein that leverage a Reconfigurable Intelligent Surface (RIS) device, also known as an Intelligent Reflective Surface device, to dynamically program the reflecting elements of the RIS device based on traffic awareness and user location to reflect/inject noise and thereby vitiating the usefulness of the wireless data captured (if any) by a malicious user.

Figure 1:
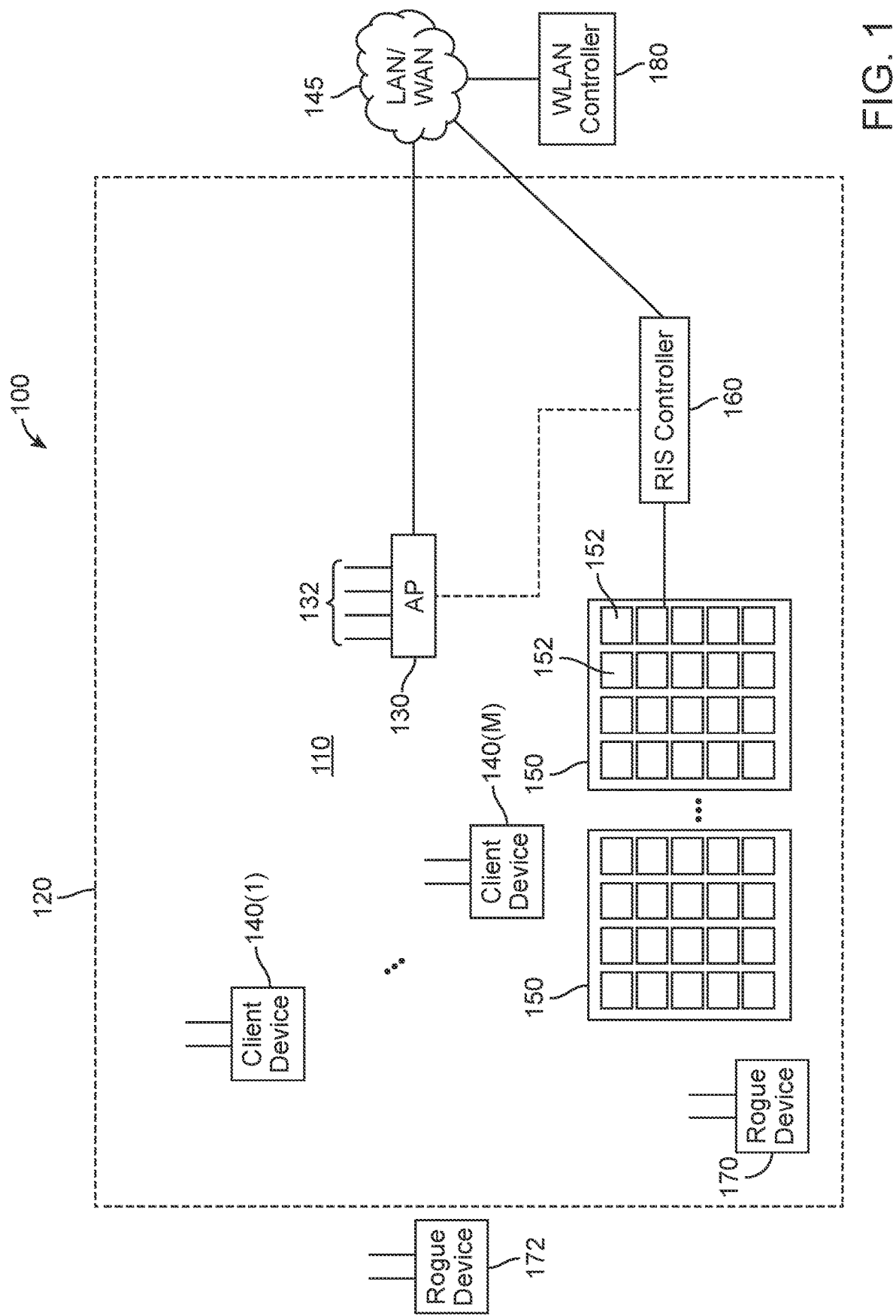
FIG. 1 is a block diagram of a system that includes a reconfigurable intelligent surface device to control the reflection of wireless transmissions to maintain security thereof, according to an example embodiment.

Referring first to FIG. 1, a system 100 is shown that includes a wireless network environment, such as wireless local area network (WLAN) 110 operating within a physical space 120, that includes at least one wireless access point (AP) 130 and one or more wireless client devices 140(1)-140(M). The AP 130 may include a plurality of antennas 132 for wireless communication. The AP 130 may provide network access to a local area network/wide area network (LAN/WAN) 145 on behalf of the wireless client devices 140(1)-140(M). There is a RIS device 150 deployed in the physical space 120. There may be a multiple RIS devices 150 deployed in the physical space 120.

An RIS controller 160 is coupled to the RIS device 150 to perform configuration controls of the RIS device 150. The RIS controller 160 may have LAN/WAN connectivity, as shown in FIG. 1, or may, in some scenarios, have connectivity to the AP 130.

FIG. 1 also shows that there may be a rogue device 170 possible within the physical space 120 and/or a rogue device 172 outside the physical space 120, but within reception range of transmissions that may occur between devices in the WLAN 110. A WLAN controller 180 may be provided that is configured to perform various control and management functions in the WLAN 110. The WLAN controller 180 may reside anywhere there is LAN/WAN connectivity.

The physical space 120 may be an apartment of a home network user, a home, or any other physical space that may be contained by walls, but which leakage of energy from transmissions within the physical space 120, may occur outside physical space 120. It is desired to prevent reception of such transmissions by unauthorized devices, such as by rogue devices 170 and/or 172.

The RIS device 150 can be considered as a metasurface with an array of engineered sub-wavelength reflecting elements 152, such as microstrip patches, whose reflection properties can be programmatically controlled using a tunable chip in the elements by changing the load impedance. One or more such metasurfaces can be centrally controlled using the RIS controller 160. The RIS device 150 is passive insofar as it reflects (without receiving and demodulating/processing) electromagnetic energy/waves by adjusting phase of the various reflecting elements 152 to direct the electromagnetic energy/waves in a particular direction, such as towards a location of a particular client device among the plurality of client devices 140(1)-140(M), or toward a location of the AP 130.

Based on the location of the AP 130 and a location of a client device (uplink) position, the RIS controller 160 dynamically controls/adjusts the phase of respective reflecting elements 152 of the RIS device 150 in order to direct electromagnetic energy inward within the physical space 120 (e.g., toward a client device or the AP 130) and away from leaking outside the physical space 120 where it may be detected by a rogue device, e.g., rogue device 172.

The system 100 may be configured to identify other devices that are not supposed to be part of the WLAN 110 that is to be protected, such as rogue devices 170 and 172. The AP 130 may be configured to listen for probes sent by other devices outside the WLAN 110, e.g., sent by rogue devices 170 and 172. The AP 130 may identify those devices, e.g., rogue devices 170 and 172, as devices for towards which to limit the amount of RF that gets propagated. The RIS controller 160 could direct a training sequence through several different configurations of the RIS device 150 to identify a configuration of the RIS device 150 that is the most impactful for the particular device that is outside of the WLAN 110, with a goal being to identify the set of phase/impedance configurations of the RIS device 150 that has an impact on diverting electromagnetic energy/waves away from those devices outside the WLAN 110.

Thus, the RIS device may be used to enhance a transmission toward an intended target device (e.g., one of the client devices 140(1)-140(M), for a downlink transmission, or the AP 130, for an uplink transmission) while effectively nulling the transmission towards to some other location, e.g., where a rogue device 170 or 172 may be located. This may be useful to maintain data confidentiality, such as for a confidential meeting stream (audio/video or presentation content), a confidential traffic flow, etc.

Transmit/Receive Location-Based Dynamic Coefficient Derivation

Figure 2:
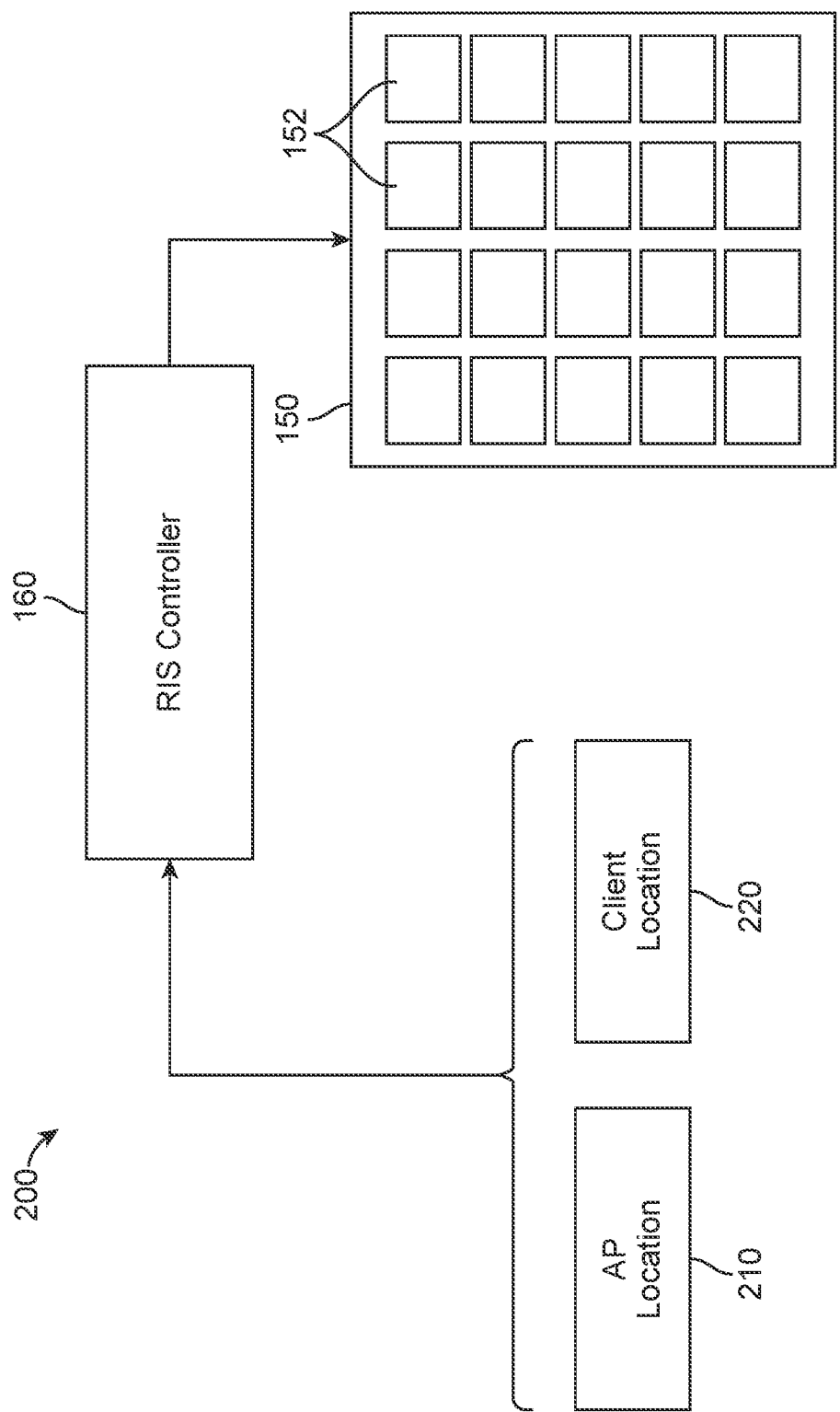
FIG. 2 is a diagram generally depicting how the reconfigurable intelligent surface device is adjusted, according to an example embodiment.

Reference is now made to FIG. 2, with continued reference to FIG. 1. FIG. 2 shows general processing flow 200 whereby an AP location 210 (of the AP 130) and a client location 220 (of one of the client devices 140(1)-140(M)) are provided as input to the RIS controller 160. The location information may be maintained by the AP 130 during its normal operations, or may be obtained from the WLAN controller 180. The RIS controller 160 configures the RIS device 150 in order to reflect transmissions (between the AP and one or more client devices) inward and avoid/minimize leakage outside the physical space 120. In order to configure the RIS device 150, the RIS controller 160 computes coefficients for the reflective elements 152 of the RIS device. The RIS controller 160 may supply these coefficients to a separate phase shifter device, or the functions of the phase shifter device may be performed by the RIS controller 160.

The current location of the AP 130 may be mostly static, but can also be dynamic, in the case of a drone AP, for example. The client location is generally mobile. The RIS controller 160 uses this location information is used to dynamically compute various coefficients (that adjust the complex impedance, and hence phase, of the reflective elements 152) to control the reflection, refraction and consumption power of RF signals that are incident on the RIS device 150.

The intelligence to compute the coefficients based on the AP/client location can reside within the AP itself, within a separate device (the RIS controller 160), or can be a hosted network virtualization function that resides in the cloud.

Traffic Aware Dynamic RIS Positioning Request

Figure 3:
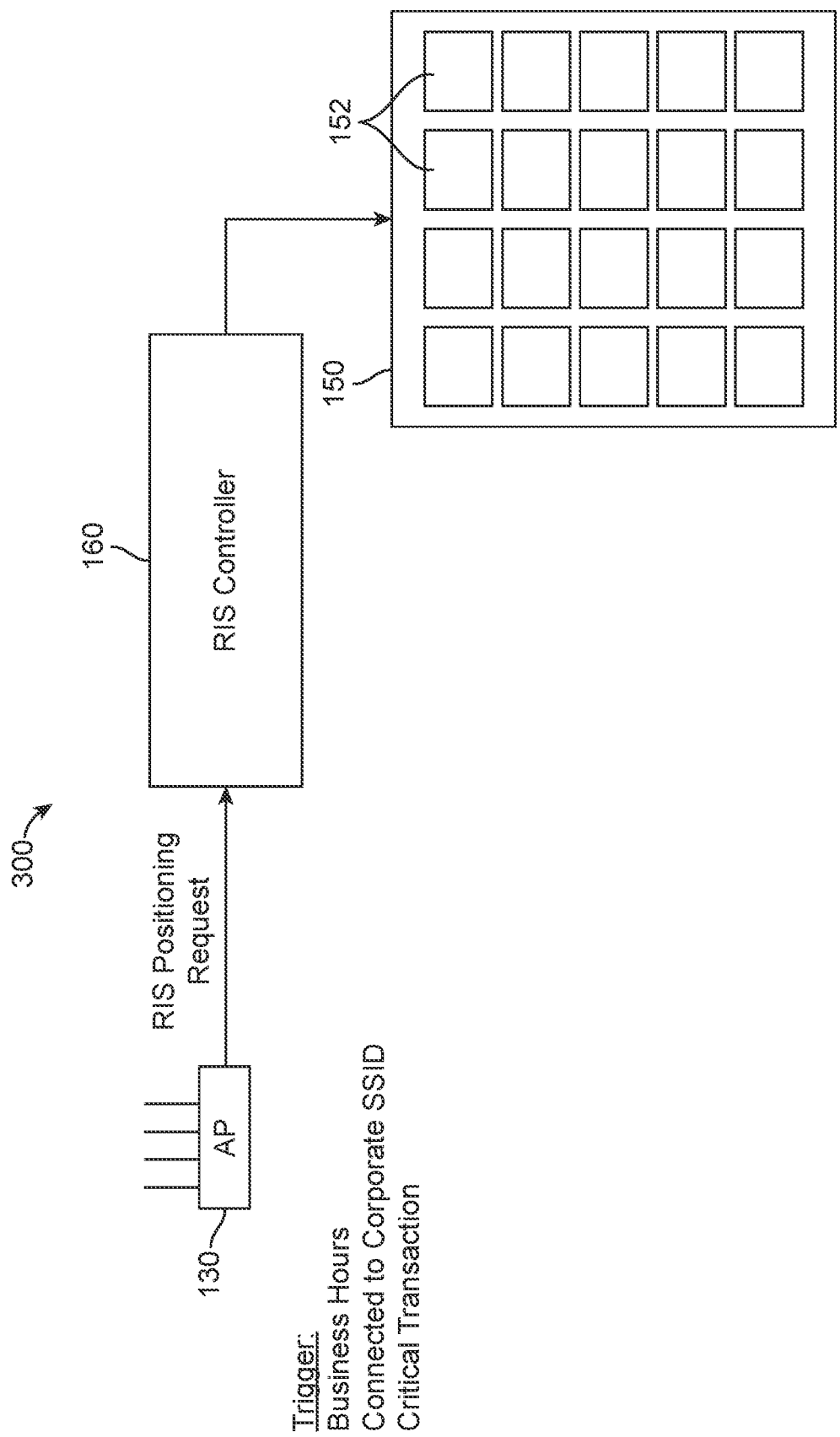
FIG. 3 is a diagram that depicts various use cases for adjusting the reconfigurable intelligent surface device, according to an example embodiment.

Reference is now made to FIG. 3, which illustrates an operational flow 300 that is a variation of that shown in FIG. 2. The AP 130 may trigger an RIS positioning request depending on certain events.

The AP 130 can be programmed with the events to trigger a RIS positioning request to the RIS controller 160. In one embodiment, the current location of the client alone can be considered as the input for the RIS controller to compute the coefficients. In another embodiment, additional details such as business hours (potential opportunity to see critical transactions during this time), connection to a corporate SSID, a particular critical transaction to be made, etc. Examples of still further granular triggers include per traffic flow, per-session, and per-transaction.

When the AP 130 is mobile (such as a drone AP), the RIS positioning request can also include current indoor location information of the AP 130, for use by the RIS controller in computing the coefficients for the RIS device 150.

Traffic Aware Multi-Antenna Based Energy Nullification

Figure 4:
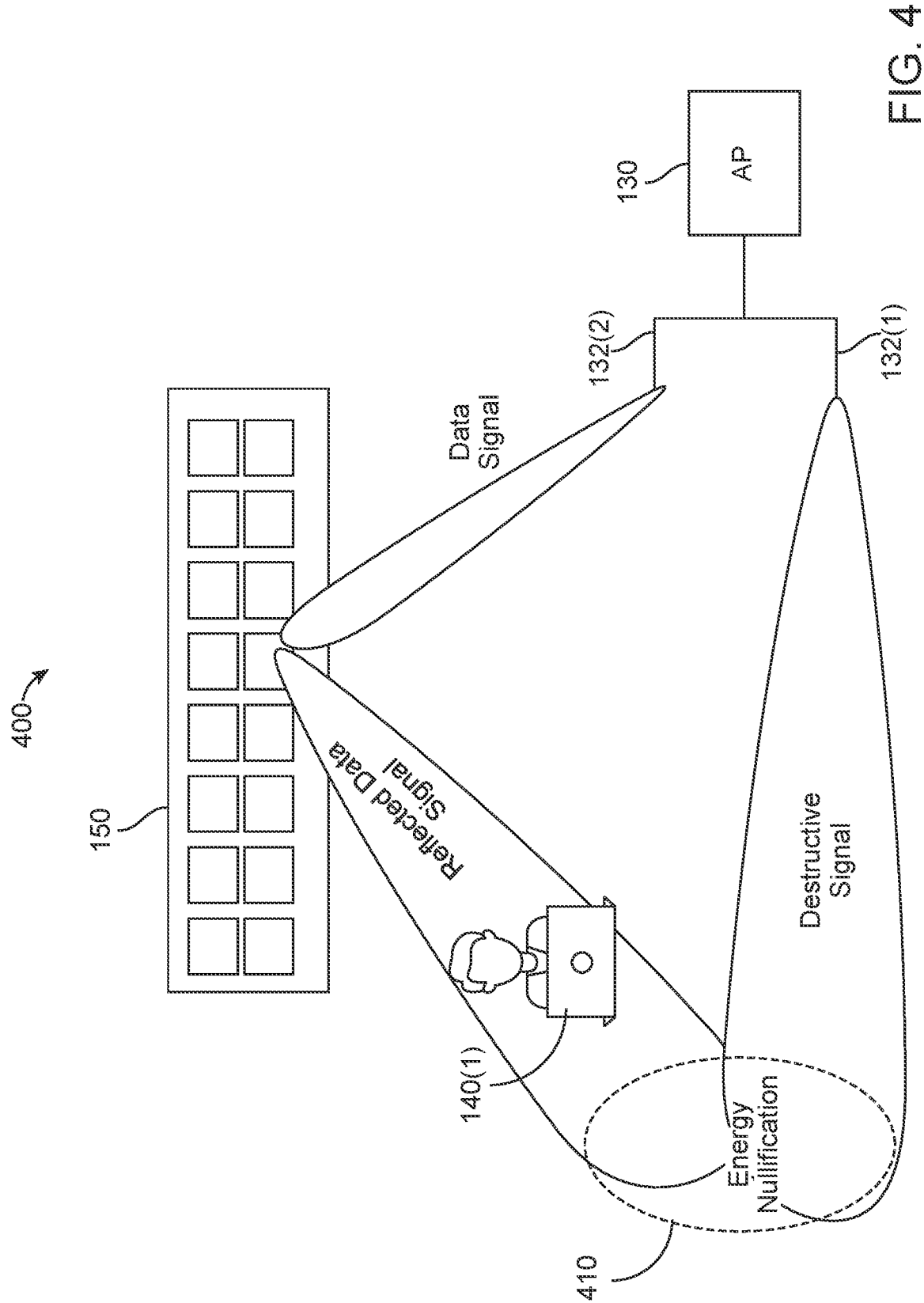
FIG. 4 is a diagram depicting one example use of the reconfigurable intelligent surface device in conjunction with a wireless access point, according to an example embodiment.

Reference is now made to FIG. 4. FIG. 4 shows an operational flow 400 according to still another embodiment. Once the RIS positioning is done based on the traffic profile and/or the client device location (as described above in connection with FIGS. 2 and 3), the AP 130 may leverage multiple antennas to send the traffic as a data signal and a destruction signal. The AP 130 may use multiple-input multiple-output (MIMO) capabilities by which it uses one antenna, 132(1) to send a destruction signal and another antenna 132(2) to send the data transmission towards the RIS device 150. The RIS device 150 will reflect the data transmission towards the intended target device, client device 140(1). The coefficients are used to control the direction and the range of the reflected data signal. The destructive signal is used for energy nullification and to avoid/limit any leak outside the premises. This is shown at 410 in FIG. 4. The dynamic coefficient computation and the multi-antenna based forwarding operation shown in FIG. 4 allows for applying this functionality on a per traffic flow basis to have more granular control, if desired.

Figure 5:
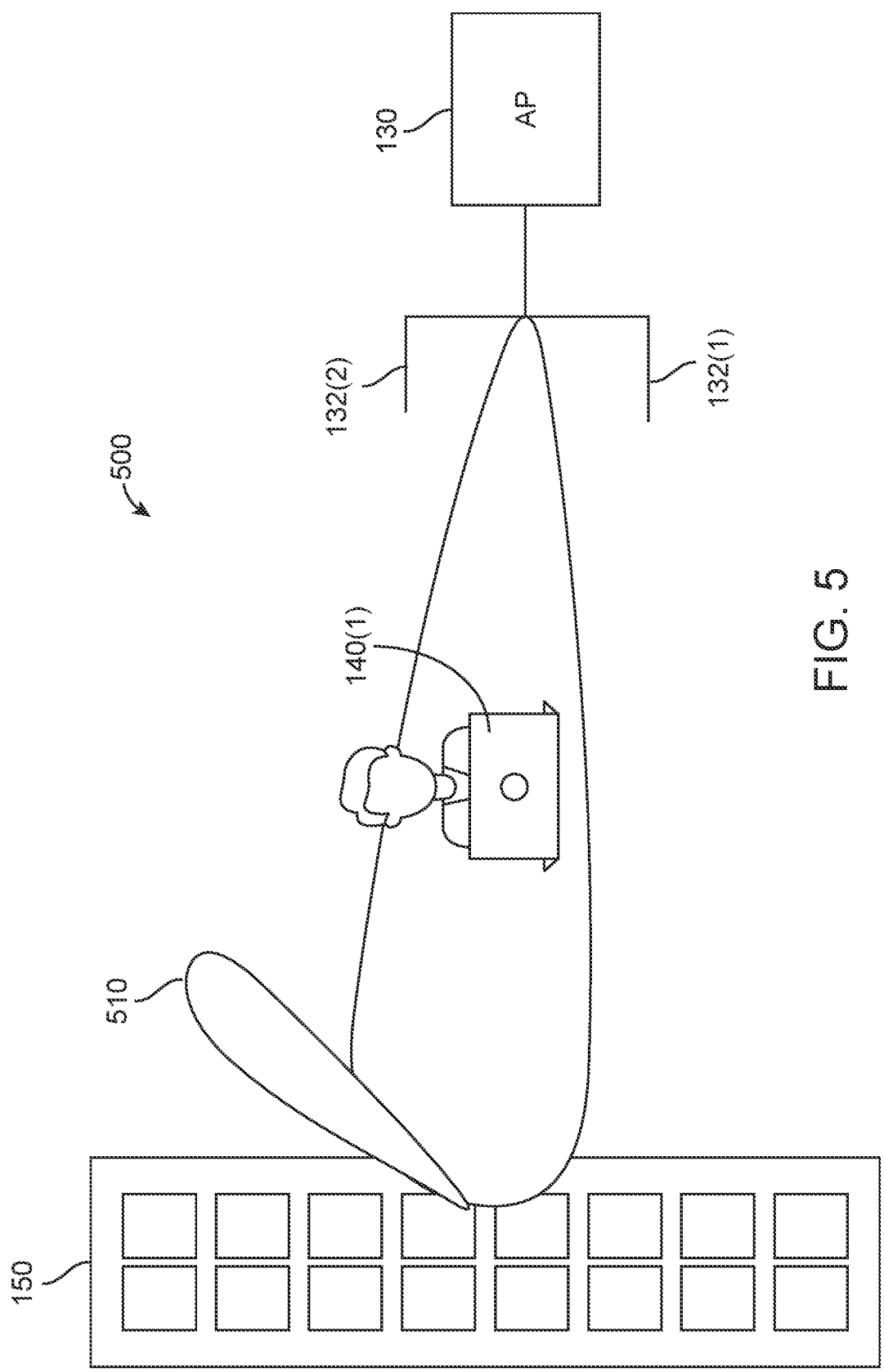
FIG. 5 is a diagram depicting use of the reconfigurable intelligent surface device to inwardly reflect a transmission from a wireless access point, according to an example embodiment.

FIG. 5 illustrates operational flow 500 similar to that shown in FIG. 4, where the RIS device 150 is used to reflect the signal inward, as shown at 510, toward the intended target client device 140(1), and avoid any leaks. When one or more such RIS devices are available within the premises, the functionality is used to dynamically control all such surfaces and position the elements to maximize privacy.

Midamble Based PHY Layer Security

In yet another embodiment, techniques are provided to leverage the availability of a midamble in the PHY layer introduced as part of IEEE 802.11ax to re-estimate the channel. By coordinating the transmission of the 802.11ax physical layer protocol data unit (PPDU) along with changes to the RIS device, the RIS device can create changes in over-the-air channel that will break the reception of the PPDUs by any device that is not intended to receive the same.

Figure 6:
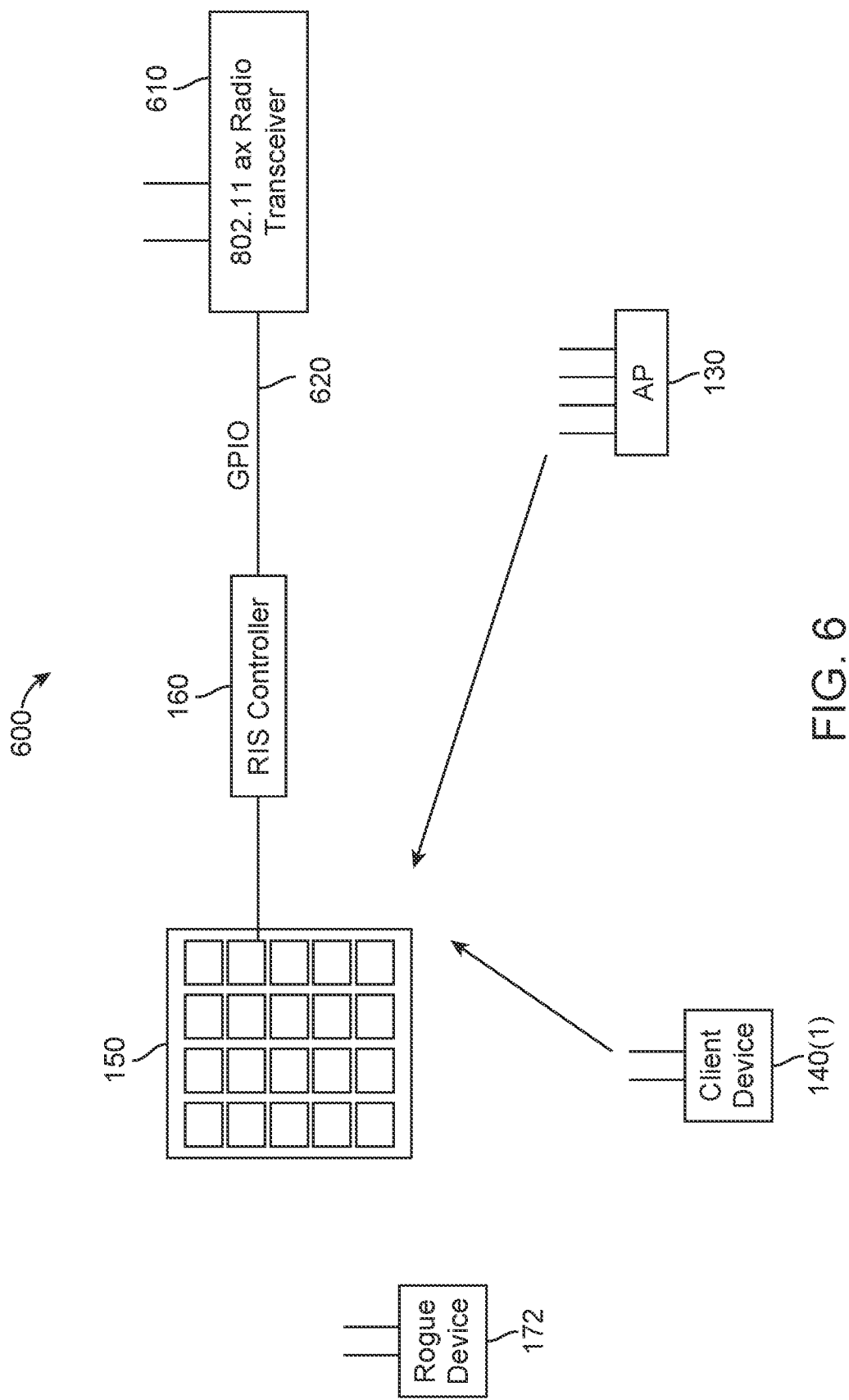
FIG. 6 is a diagram depicting a system in which adjusting of the reconfigurable intelligent surface device is coordinated with timing of transmissions made by a wireless access point or wireless client device, according to an example embodiment.

Reference is now made to FIG. 6. FIG. 6 shows a system 600 that includes an RIS device 150, an RIS controller 160, and an 802.11ax radio transceiver 610. The RIS controller 160 controls the RIS phase array state of the RIS device 150 and is in communication with the 802.11ax radio transceiver via a General Purpose Input/Output (GPIO) interface 620, which is a standard interface used to connect microcontrollers to other electronic devices. Alternatively, the RIS controller 160 is coupled to the 802.11ax radio transceiver 610 via an over-the-air negotiation/link.

The AP 130 will scan for the RIS device 150, via the 802.11ax radio transceiver 610 and establish a secured channel, with the RIS controller 160 of the RIS device 150. The RIS controller 160 and the AP 130 establish a secure exchange of capabilities, and in particular, and establishes the RIS controller 160 to switch the configuration of the RIS device 150 with at a time corresponding to a particular part of a symbol in a transmission between the AP 130 and the client device 140(1). For example, the particular part of the symbol may be mid-PPDU symbol, such as a midamble of a symbol. This makes the channel change in a way that a device that is snooping, e.g., rogue device 172, cannot decode the transmission. On the other hand, devices that are aware of the coordinated changes to be made by the RIS device 150 can make use of the particular part of the symbol (e.g., midambles) to recover all the intended transmission. The AP 130 could coordinate with one or more RIS devices to time the changing of the configuration of the RIS device with certain parts of the 802.11ax symbol. There could be multiple RIS devices in a space (as shown in FIG. 1), and the AP 130 may find the best RIS device to coordinate with given the client device (or AP) that is to be protected, such as selecting the RIS device for which there is the least amount of change in the channel for a particular device.

Figure 7A:
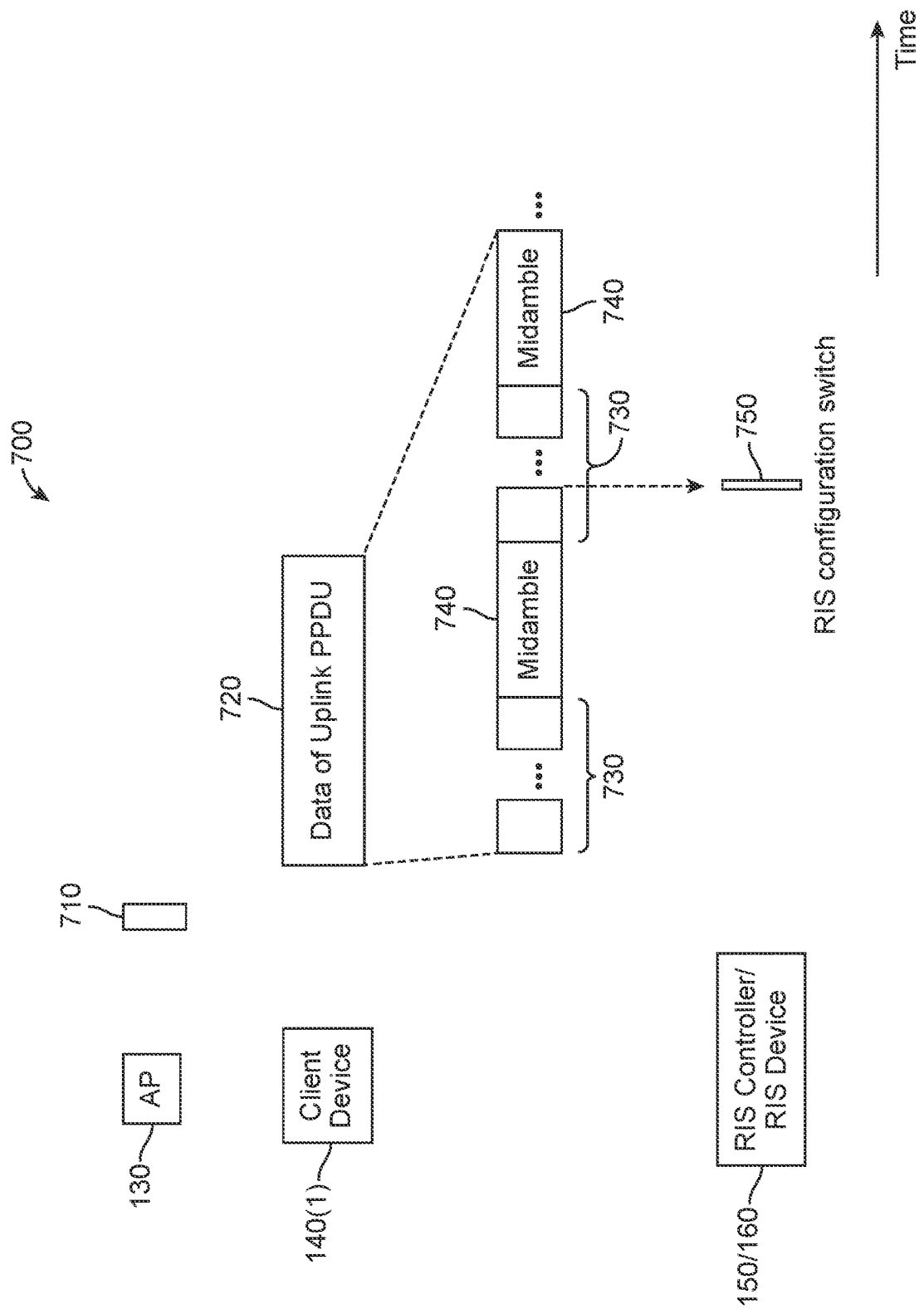
FIG. 7A is a timing diagram illustrating a process to coordinate adjusting of the reconfigurable intelligent surface device during an uplink transmission, according to an example embodiment.

Reference is now made to FIG. 7A, with continued reference to FIG. 6. FIG. 7A illustrates a process 700 by which the coordination of the configuration changes to an RIS device is achieved, according to an example embodiment. The AP 130 transmits an uplink trigger frame 710. Client device 140(1) receives the uplink trigger frame to initiate an uplink transmission to the AP 130. The 802.11ax radio transceiver 610 detects the uplink trigger frame 710 sent by the AP 130 and sets a timer to switch at a rate consistent with a midamble frequency that is specified in the common information field of the uplink trigger frame 710. The client device 140(1) sends the uplink transmission, and FIG. 7A shows the data portion 720 of an uplink PPDU. As is known according to the IEEE 802.11ax specification, the data portion 720 of an uplink PPDU includes a plurality of data symbols 730, with a midamble 740 occurring at a particular frequency between data symbols 730, as shown in FIG. 7A.

In one embodiment, the RIS device configuration change starts during the data portion of the uplink PPDU after the first midamble. Moreover, the RIS device configuration switching may be performed at symbol boundaries to avoid transient effects. This is shown at reference numeral 750 in FIG. 7A. Thus, the RIS controller 160 knows the timing of the uplink trigger frame 710 and knows that after the uplink trigger frame, an uplink transmission is going to occur. The RIS controller 160 knows the precise timing of that because it should happen a predetermined period of time after the trigger frame ends. Once the uplink PPDU occurs, the RIS controller 160 will time a change in the RIS device that will coincide with the presence of the midamble, and in particular, after the first midamble in the data portion 720 and at a symbol boundary.

The AP 130 keeps both previous and midamble-updated channel estimates and applies the one that works better based on a check of which works better on a subset of pilot tones. Thus, the AP 130 keeps track of two channel states: the previous state that existed, and the state that is updated from the midamble, and it knows precisely when to switch using them because that will coincide with the RIS device changing. A rogue device does not know about this timing and changing, and it would therefore not be able to receive and decode that uplink transmission.

Figure 7B:
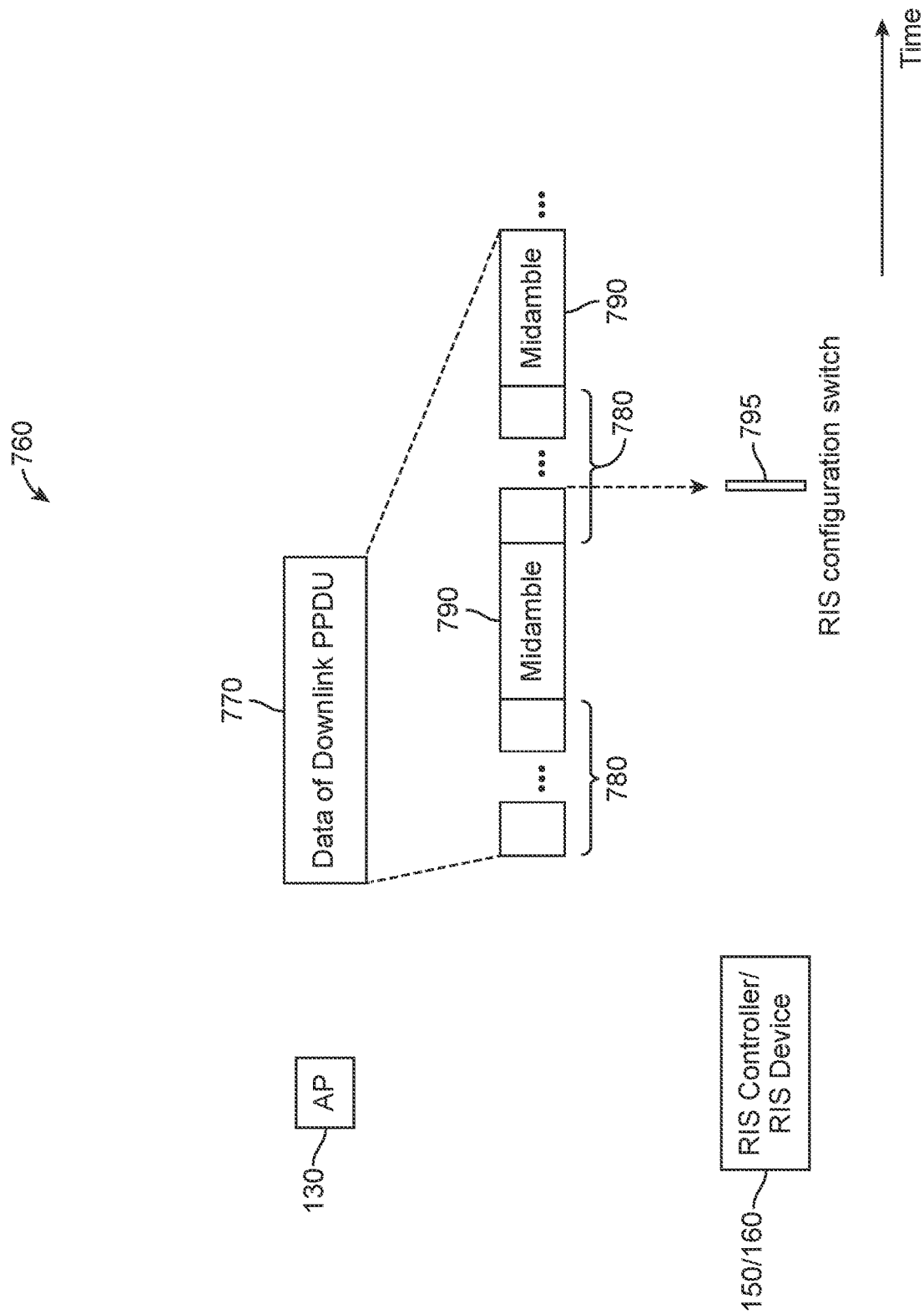
FIG. 7B is a timing diagram illustrating a process to coordinate adjusting of the reconfigurable intelligent surface device during a downlink transmission, according to an example embodiment.

Reference is now made to FIG. 7B with continued reference to FIG. 6. FIG. 7B illustrates a process 760 similar that that shown in FIG. 7A, but for a downlink transmission. The AP 130 sends a downlink transmission including a data portion 770. The data portion 770 includes data symbols 780 with midambles 790 interspersed. The 802.11ax radio transceiver 610 detects the start of the data portion 770 and the RIS controller 160 triggers RIS device changes at symbol boundaries, as shown at 795, after the first midamble 790.

As described above, client devices that support this capability keep both previous and updated midamble channel estimates and apply the channel estimate that works better based on a check of which works better on subset of pilot tones.

Figure 8:
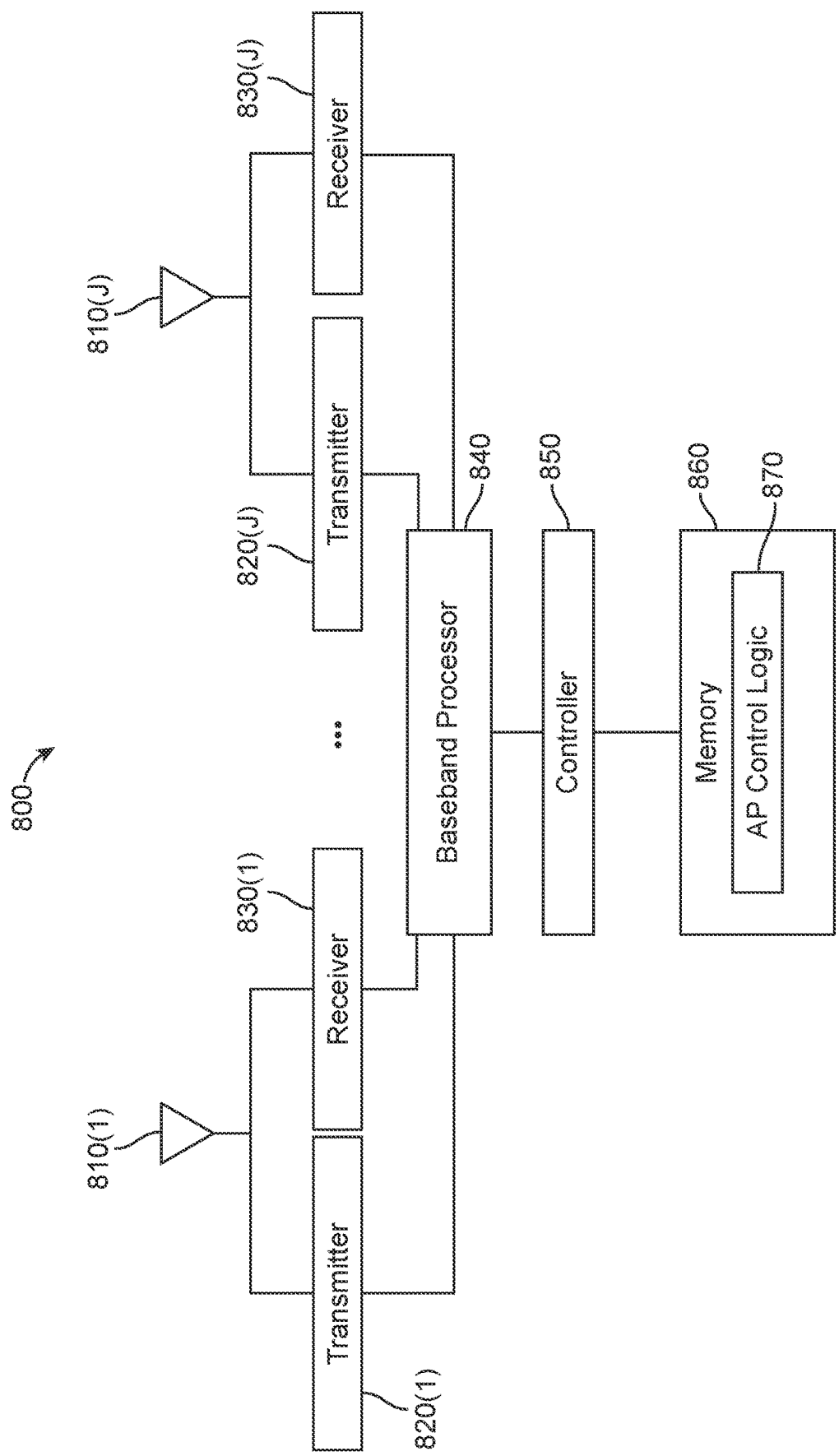
FIG. 8 is a block diagram of a wireless access point that is configured to participate in the various methods presented herein, according to an example embodiment.

Turning now to FIG. 8, a block diagram is shown of an AP 800 that may be suitable for performing the operations of AP 130 referred to above in connection with FIGS. 1-7B. The AP 800 may be fully MU-MIMO capable (pursuant to IEEE 802.11ax). To this end, the AP 800 includes a plurality of antennas 810(1)-810(J). There is a transmitter 820(1) and a receiver 830(1) associated with antenna 310(1) and a transmitter and a receiver 820(J) and a receiver 830(J) associated with antenna 810(J). A baseband processor (modem) 840 is connected to the transmitters 820(1)-820(J) and to the receiver 830(1)-830(J). The baseband processor 840 is configured to perform the baseband modulation signal processing and baseband demodulation signal processing. The baseband processor 840 may be configured to perform MU-MIMO uplink and downlink signal processing.

A controller 850 is coupled to the baseband processor 840 and performs higher-level control functions of the serving AP 800. The controller 850 may be a microprocessor, microcontroller or digital signal processor. A memory 860 stores instructions for AP control logic 870 that the controller 850 executes to perform the control functions of the AP.

The AP 800 coordinates all downlink and uplink events. These functions of the AP 800 are performed under control and execution by the controller 850 of the 8 AP control logic 870, and in coordination with operations performed by the baseband processor 840.

Figure 9:
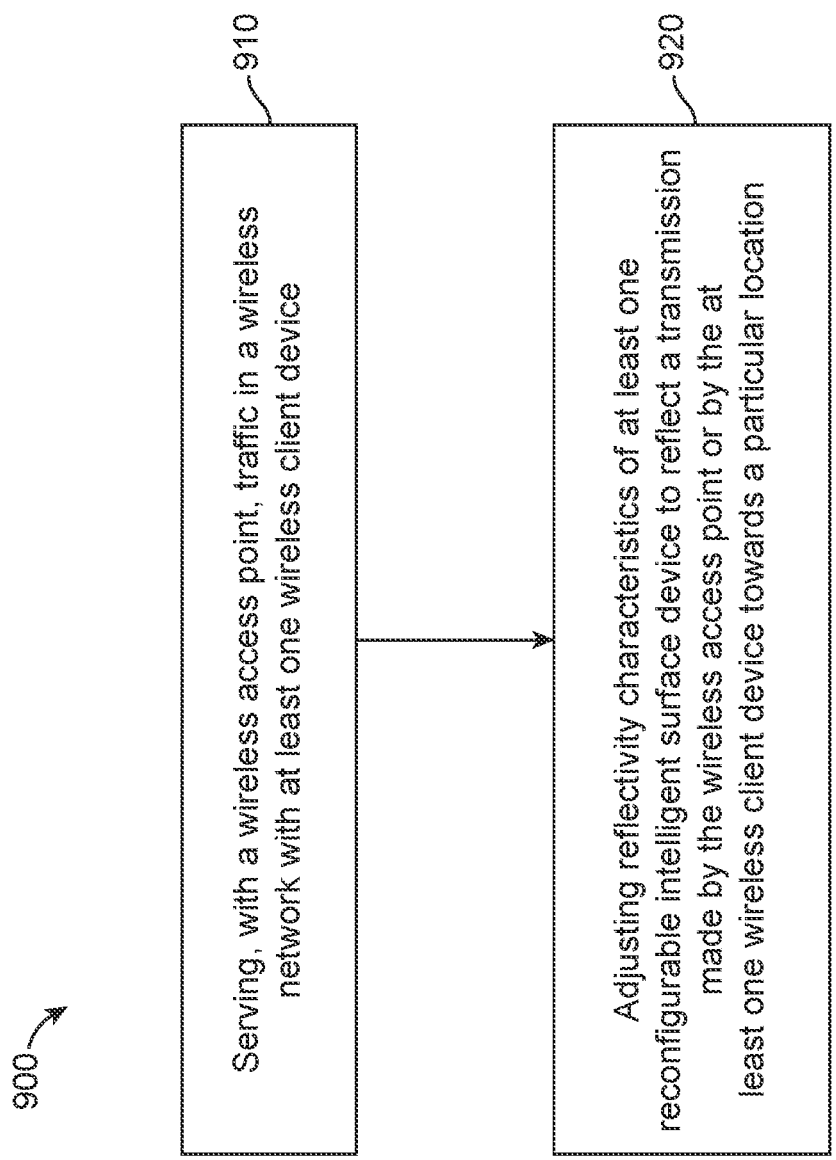
FIG. 9 is a flow chart of a method according to an example embodiment.

Reference is now made to FIG. 9. FIG. 9 illustrates a flow chart of a process 900 according to an example embodiment.

The process 900 may be performed in a wireless network arrangement, similar to that shown in FIGS. 1-6, 7A and 7B. A step 910, the process 900 includes serving, with a wireless access point, traffic in a wireless network with at least one wireless client device. At step 920, the process 900 includes adjusting reflectivity characteristics of at least one reconfigurable intelligent surface device to reflect a transmission made by the wireless access point or by the at least one wireless client device towards a particular location.

Figure 10:
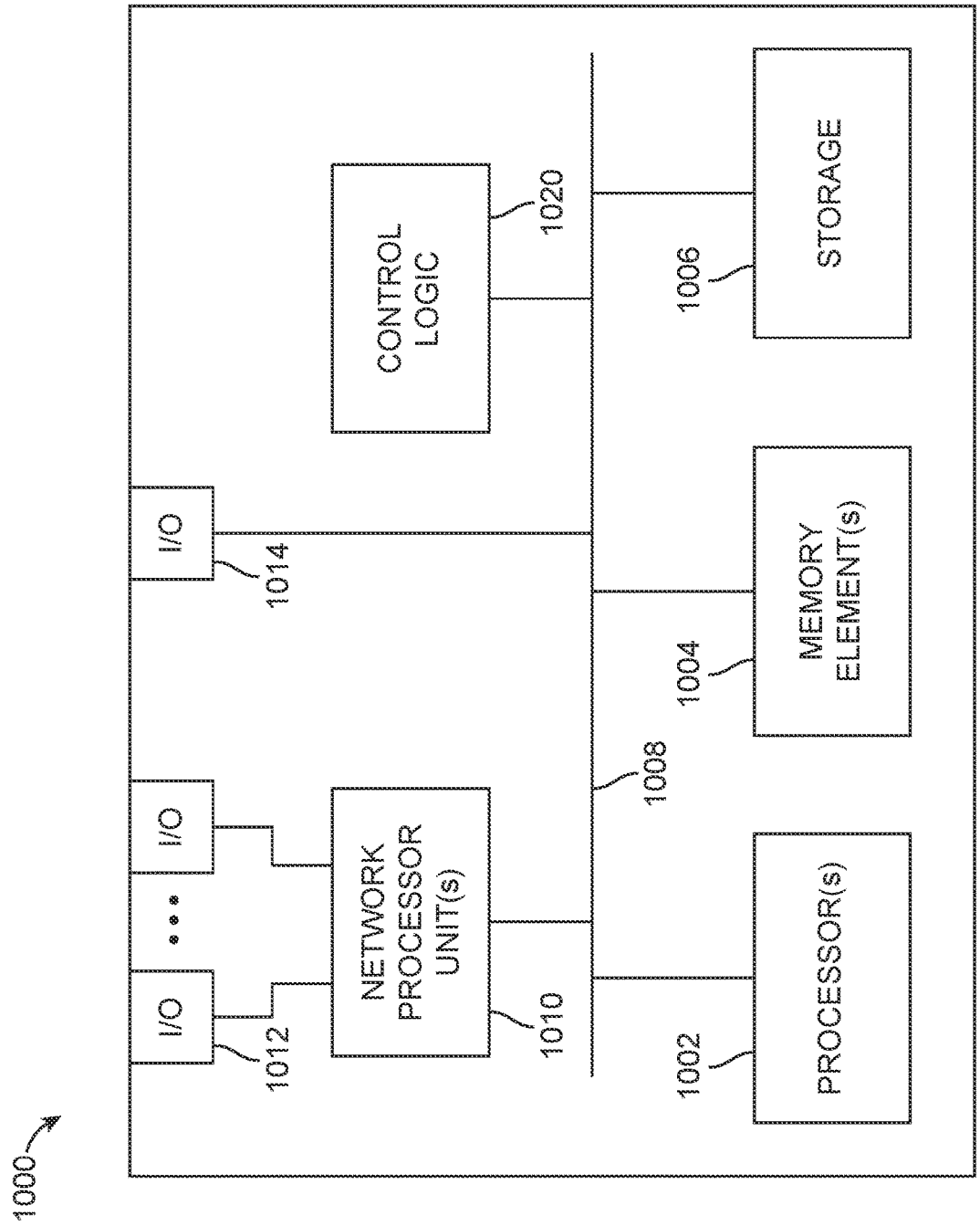
FIG. 10 is a block diagram of a computing device that may be configured to control the adjustment of the reconfigurable intelligent surface device, according to an example embodiment.

Referring to FIG. 10, FIG. 10 illustrates a high-level hardware block diagram of a computing device 1000 that may be configured to perform operations of the techniques presented herein, such as operations performed by the RIS controller 160 (or an apparatus that is a combination of AP 130 with RIS controller 160) that adjusts the reflectivity characteristics of the RIS device 150.

In at least one embodiment, the computing device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a monitor, a display screen, or the like.

In various embodiments, control logic 1020 can include instructions that, when executed, cause processor(s) 1002 to perform operations, which can include, but not be limited to, providing overall control operations of host device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a host device for transfer onto another computer readable storage medium.

In some aspects, the techniques described herein relate to a system including: at least one wireless access point configured to serve at least one wireless client device in a wireless network; a reconfigurable intelligent surface device configured to reflect transmissions; and a controller that configures the reconfigurable intelligent surface device to reflect a transmission, made by the at least one wireless access point or by the at least one wireless client device, towards a first location.

In some aspects, the techniques described herein relate to a system, wherein the controller further configures the reconfigurable intelligent surface device to reflect the transmission away from one or more locations within and/or outside a physical space where it is desired to prevent reception of the transmission.

In some aspects, the techniques described herein relate to a system, wherein the reconfigurable intelligent surface device includes an array of sub-wavelength electromagnetic energy reflecting elements whose reflectivity characteristics are programmatically controlled by changing an impedance.

In some aspects, the techniques described herein relate to a system, wherein the controller dynamically computes coefficients used to control reflection, refraction and consumption power of transmissions by the reconfigurable intelligent surface device, based on a location of the at least one wireless access point and a location of the at least one wireless client device.

In some aspects, the techniques described herein relate to a system, wherein the at least one wireless access point is configured to initiate a request to the controller to configure the reconfigurable intelligent surface device based at least on the location of the at least one wireless client device.

In some aspects, the techniques described herein relate to a system, wherein the at least one wireless access point is programmed with one or more events to trigger the request to protect transmissions, the one or more events including: time of day, a particular traffic flow, a particular communication session, and a particular transaction.

In some aspects, the techniques described herein relate to a system, wherein the at least one wireless access point includes in the request, information indicating a location of the at least one wireless access point.

In some aspects, the techniques described herein relate to a system, wherein the at least one wireless access point includes a plurality of antennas, and wherein the at least one wireless access point uses at least a first antenna of the plurality of antennas to transmit a nulling signal towards a second location and uses at least a second antenna of the plurality of antennas to send a transmission to the reconfigurable intelligent surface device for reflection towards the first location.

In some aspects, the techniques described herein relate to a system, further including a wireless transceiver coupled to the reconfigurable intelligent surface device, wherein the wireless transceiver is configured to detect transmissions by the at least one wireless access point and the reconfigurable intelligent surface device is configured to coordinate timing of a change of reflectivity characteristics with respect to a particular part of the transmission between the at least one wireless access point and the at least one wireless client device.

In some aspects, the techniques described herein relate to a system, wherein the particular part is a midamble of a data portion of the transmission.

In some aspects, the techniques described herein relate to a system, wherein the transmission is an uplink transmission from the at least one wireless client device to the at least one wireless access point or a downlink transmission from the at least one wireless access point to the at least one wireless client device.

In some aspects, the techniques described herein relate to a method including: serving, with a wireless access point, traffic in a wireless network with at least one wireless client device; and adjusting reflectivity characteristics of a reconfigurable intelligent surface device to reflect a transmission made by the wireless access point or by the at least one wireless client device towards a first location.

In some aspects, the techniques described herein relate to a method, wherein adjusting includes configuring the reconfigurable intelligent surface device to reflect the transmission away from one or more locations within and/or outside a physical space where it is desired to prevent reception of the transmission.

In some aspects, the techniques described herein relate to a method, wherein adjusting is based on one or more events including: time of day, a particular traffic flow, a particular communication session, and a particular transaction.

In some aspects, the techniques described herein relate to a method, further including: coordinating timing of a change of reflectivity characteristics of the reconfigurable intelligent surface device with respect to a particular part of the transmission between the wireless access point and the at least one wireless client device.

In some aspects, the techniques described herein relate to a method, wherein the particular part is a midamble of a data portion of the transmission, and wherein the transmission is an uplink transmission from the at least one wireless client device to the wireless access point or a downlink transmission from the wireless access point to the at least one wireless client device.

In some aspects, the techniques described herein relate to an apparatus including: a network interface that enables network communications including communication with a wireless access point that serves traffic in a wireless network with at least one wireless client device; and a processor coupled to the network interface, wherein the processor is configured to generate one or more controls provided to a reconfigurable intelligent surface device cause the reconfigurable intelligent surface device to adjust reflectivity characteristics of a transmission made by the wireless access point or by the at least one wireless client device towards a first location.

In some aspects, the techniques described herein relate to an apparatus, wherein the processor is configured to generate the one or more controls to cause the reconfigurable intelligent surface device to reflect the transmission away from one or more locations within and/or outside a physical space where it is desired to prevent reception of the transmission.

In some aspects, the techniques described herein relate to an apparatus, wherein the processor is configured to generate the one or more controls based one or more events including: time of day, a particular traffic flow, a particular communication session, and a particular transaction.

In some aspects, the techniques described herein relate to an apparatus, wherein the processor is configured to coordinate timing of a change of reflectivity characteristics of the reconfigurable intelligent surface device with respect to a particular part of the transmission between the wireless access point and the at least one wireless client device, wherein the particular part is a midamble of a data portion of the transmission, and wherein the transmission is an uplink transmission from the at least one wireless client device to the wireless access point or a downlink transmission from the wireless access point to the at least one wireless client device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

In summary, a system and methods are provided by which an RIS device is dynamically configured to control the reflection of transmissions made between an AP and one or more client devices so as to protect the transmissions from being properly received by an unauthorized device. These methods may be used to maintain data confidentiality, particular for remote workers. The positions of the AP and client devices are used to configure the reflectarray (RIS device) to reflect the transmissions inward and avoid/minimize leakage outside a physical space.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A system comprising:
    at least one wireless access point configured to serve at least one wireless client device in a wireless network;
    a reconfigurable intelligent surface device configured to reflect transmissions, wherein the reconfigurable intelligent surface device comprises an array of sub-wavelength electromagnetic energy reflecting elements whose reflectivity characteristics are controlled by changing an impedance; and
    a controller that configures the reconfigurable intelligent surface device to reflect a transmission, made by the at least one wireless access point or by the at least one wireless client device, towards a first location, wherein the controller dynamically computes coefficients used to control reflection, refraction and consumption of transmissions by the reconfigurable intelligent surface device, based on a location of the at least one wireless access point and a location of the at least one wireless client device.

2. The system of claim 1, wherein the controller further configures the reconfigurable intelligent surface device to reflect the transmission away from one or more locations within and/or outside a physical space where it is desired to prevent reception of the transmission.

3. The system of claim 1, wherein the at least one wireless access point is configured to initiate a request to the controller to configure the reconfigurable intelligent surface device based at least on the location of the at least one wireless client device.

4. The system of claim 3, wherein the at least one wireless access point is programmed with one or more events to trigger the request to protect transmissions, the one or more events including: time of day, a particular traffic flow, a particular communication session, and a particular transaction.

5. The system of claim 3, wherein the at least one wireless access point includes in the request, information indicating a location of the at least one wireless access point.

6. A system comprising:
    at least one wireless access point configured to serve at least one wireless client device in a wireless network;
    a reconfigurable intelligent surface device configured to reflect transmissions; and
    a controller that configures the reconfigurable intelligent surface device to reflect a transmission, made by the at least one wireless access point or by the at least one wireless client device, towards a first location,
    wherein the at least one wireless access point includes a plurality of antennas, and wherein the at least one wireless access point uses at least a first antenna of the plurality of antennas to transmit a nulling signal towards a second location and uses at least a second antenna of the plurality of antennas to send a transmission to the reconfigurable intelligent surface device for reflection towards the first location.

7. The system of claim 6, wherein the controller dynamically computes coefficients used to control reflection, refraction and consumption of transmissions by the reconfigurable intelligent surface device, based on a location of the at least one wireless access point and a location of the at least one wireless client device.

8. The system of claim 7, wherein the controller configures the reconfigurable intelligent surface device based at least on the location of the at least one wireless client device based on a request received from the at least one wireless access point.

9. The system of claim 8, wherein the at least one wireless access point is programmed with one or more events to trigger the request to protect transmissions, the one or more events including: time of day, a particular traffic flow, a particular communication session, and a particular transaction.

10. A system comprising:
at least one wireless access point configured to serve at least one wireless client device in a wireless network;
a reconfigurable intelligent surface device configured to reflect transmissions;
a controller that configures the reconfigurable intelligent surface device to reflect a transmission, made by the at least one wireless access point or by the at least one wireless client device, towards a first location; and
a wireless transceiver coupled to the reconfigurable intelligent surface device, wherein the wireless transceiver is configured to detect transmissions by the at least one wireless access point and the reconfigurable intelligent surface device is configured to coordinate timing of a change of reflectivity characteristics with respect to a particular part of the transmission between the at least one wireless access point and the at least one wireless client device.

11. The system of claim 10, wherein the particular part is a midamble of a data portion of the transmission.

12. The system of claim 11, wherein the transmission is an uplink transmission from the at least one wireless client device to the at least one wireless access point or a downlink transmission from the at least one wireless access point to the at least one wireless client device.

13. A method comprising:
serving, with a wireless access point, traffic in a wireless network with at least one wireless client device;
adjusting reflectivity characteristics of a reconfigurable intelligent surface device to reflect a transmission made by the wireless access point or by the at least one wireless client device towards a first location; and
coordinating timing of a change of reflectivity characteristics of the reconfigurable intelligent surface device with respect to a particular part of the transmission between the wireless access point and the at least one wireless client device.

14. The method of claim 13, wherein adjusting comprises configuring the reconfigurable intelligent surface device to reflect the transmission away from one or more locations within and/or outside a physical space where it is desired to prevent reception of the transmission.

15. The method of claim 13, wherein adjusting is based on one or more events including: time of day, a particular traffic flow, a particular communication session, and a particular transaction.

16. The method of claim 13, wherein the particular part is a midamble of a data portion of the transmission, and wherein the transmission is an uplink transmission from the at least one wireless client device to the wireless access point or a downlink transmission from the wireless access point to the at least one wireless client device.

17. An apparatus comprising:
a network interface that enables network communications including communication with a wireless access point that serves traffic in a wireless network with at least one wireless client device; and
a processor coupled to the network interface, wherein the processor is configured to generate one or more controls provided to a reconfigurable intelligent surface device cause the reconfigurable intelligent surface device to adjust reflectivity characteristics of a transmission made by the wireless access point or by the at least one wireless client device towards a first location, wherein the processor is configured to coordinate timing of a change of reflectivity characteristics of the reconfigurable intelligent surface device with respect to a particular part of the transmission between the wireless access point and the at least one wireless client device.

18. The apparatus of claim 17, wherein the processor is configured to generate the one or more controls to cause the reconfigurable intelligent surface device to reflect the transmission away from one or more locations within and/or outside a physical space where it is desired to prevent reception of the transmission.

19. The apparatus of claim 17, wherein the processor is configured to generate the one or more controls based one or more events including: time of day, a particular traffic flow, a particular communication session, and a particular transaction.

20. The apparatus of claim 17, wherein the particular part is a midamble of a data portion of the transmission, and wherein the transmission is an uplink transmission from the at least one wireless client device to the wireless access point or a downlink transmission from the wireless access point to the at least one wireless client device.

* * * * *